No. 865,068. PATENTED SEPT. 3, 1907.
K. WEMAN & A. LARSSON.
ELECTRIC GENERATOR.
APPLICATION FILED MAY 21, 1906.

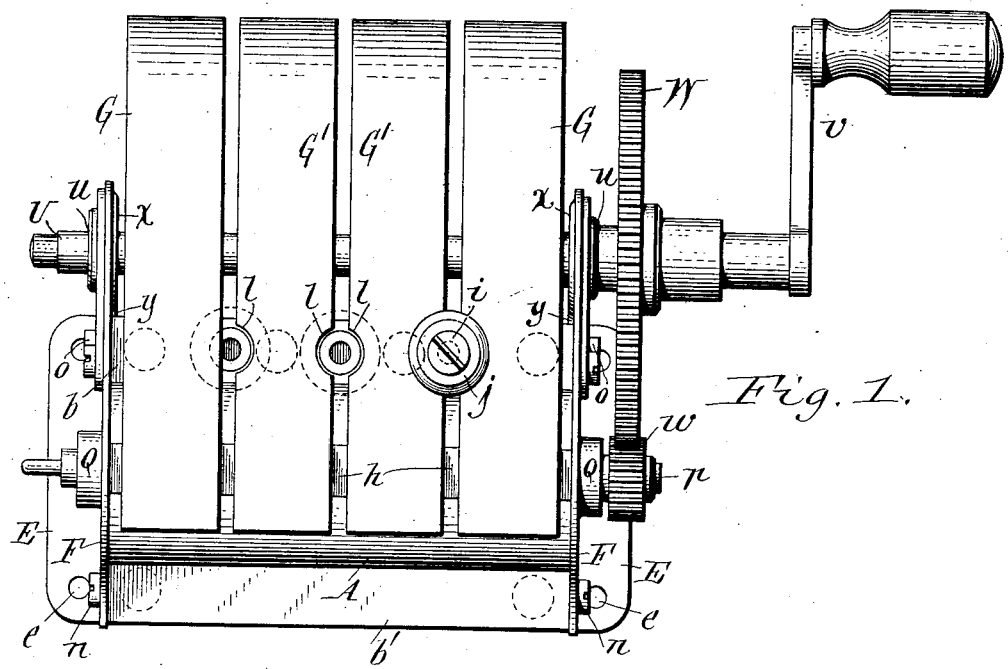
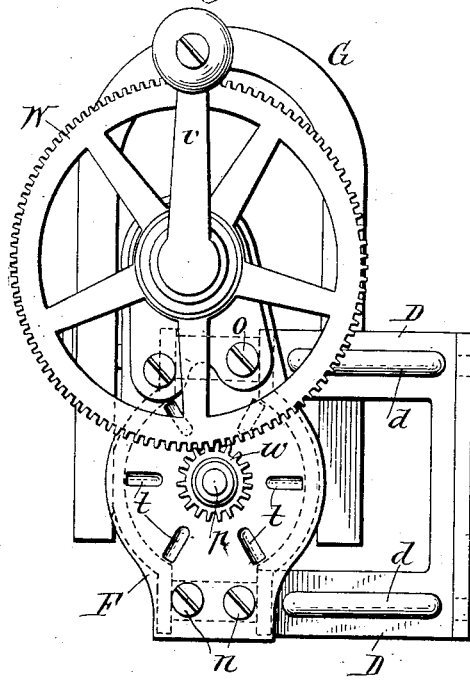
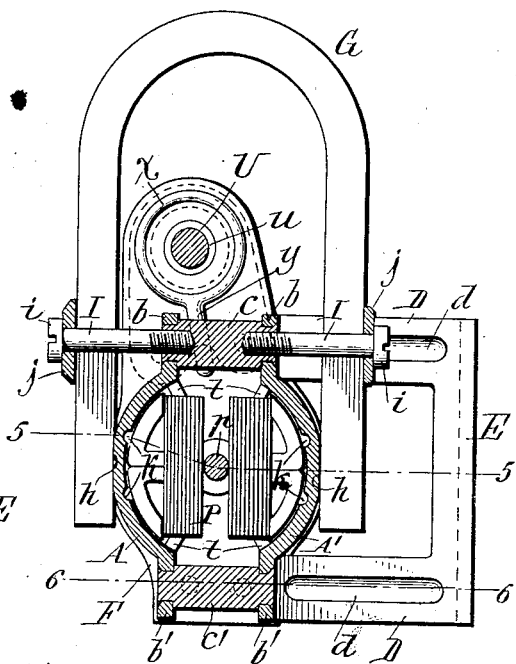

3 SHEETS—SHEET 2.

No. 865,068. PATENTED SEPT. 3, 1907.
K. WEMAN & A. LARSSON.
ELECTRIC GENERATOR.
APPLICATION FILED MAY 21, 1906.

3 SHEETS—SHEET 3.

Witnesses:
Richard Sommer.
Anna Heigis.

Inventors
Klas Weman
Alfred Larsson
by Geyer & Popp
Attorneys

UNITED STATES PATENT OFFICE.

KLAS WEMAN AND ALFRED LARSSON, OF BUFFALO, NEW YORK.

ELECTRIC GENERATOR.

No. 865,068.

Specification of Letters Patent.

Patented Sept. 3, 1907.

Application filed May 21, 1906. Serial No. 317,912.

*To all whom it may concern:*

Be it known that we, KLAS WEMAN, a citizen of the United States, and ALFRED LARSSON, a subject of the King of Sweden, residing at Buffalo, in the county of Erie and State of New York, have invented a new and useful Improvement in Electric Generators, of which the following is a specification.

This invention relates to that class of electrical generators which are more particularly designed for use in the signaling mechanism of telephone systems.

The objects generally of this invention are to provide an efficient generator of this character in which all of the principal parts are made of stampings and automatic turnings but more specifically to provide a main frame which is so constructed that the parts of the generator are supported without straining the bearings of the armature shaft or displacing the latter relatively to the pole pieces; to improve the means whereby the generator is attached to the supporting surface; to construct the pole pieces so that the faces thereof which are engaged by the magnets are produced by stamping instead of by milling; to provide simple and reliable means for centering the end plates of the frame on the pole pieces thereof so that the armature will always be retained axially between the pole pieces; to improve the means for mounting the bearings of the armature shaft on the end plates of the frame; to so construct the magnets that a greater or less number of the same may be mounted on the same frame, and to improve the generator in other respects.

Figure 4:
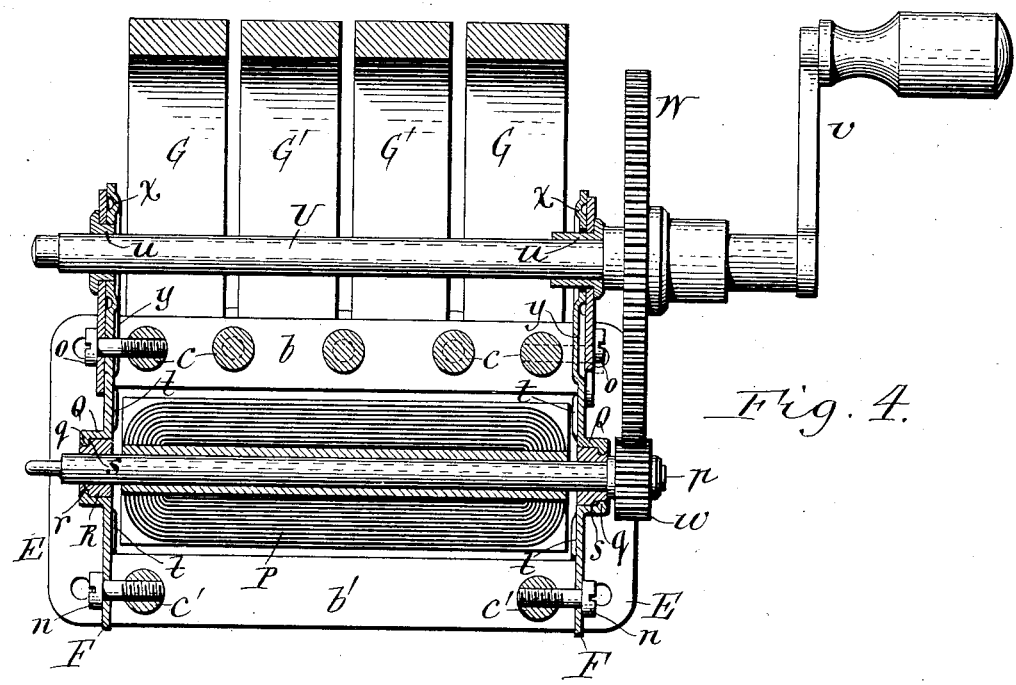
Figure 5:
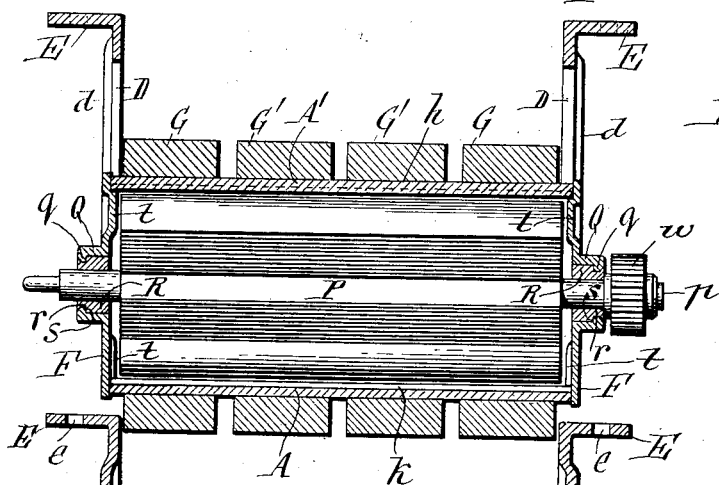
Figure 6:
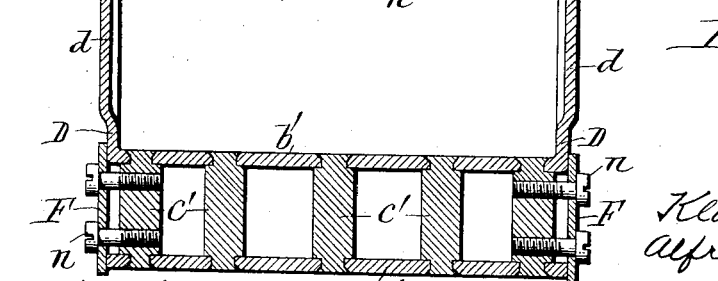
Figure 7:
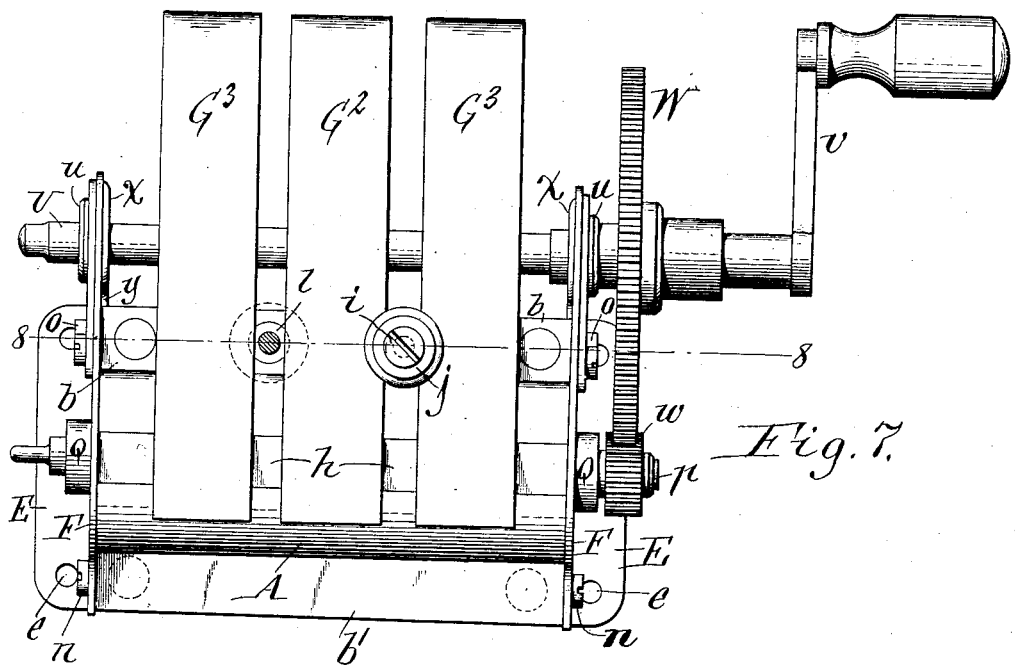
Figure 8:
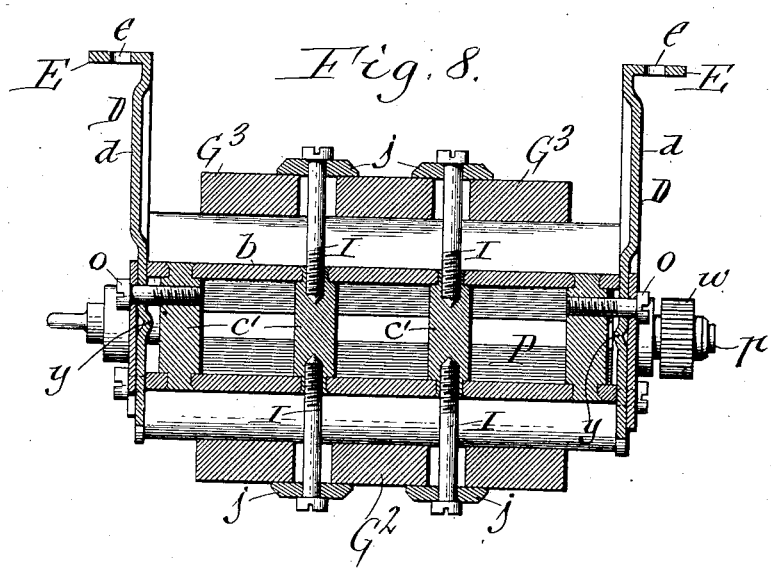

In the accompanying drawings consisting of three sheets: Figure 1 is a side elevation of a telephone generator embodying our improvements, two of the magnet fastening screws being removed for the purpose of illustrating one feature of our invention. Fig. 2 is an end elevation of the same. Fig. 3 is a vertical cross section thereof. Fig. 4 is a vertical longitudinal section of the same. Figs. 5 and 6 are horizontal sections taken in lines 5—5, and 6—6, Fig. 3, respectively. Fig. 7 is a side elevation of a telephone generator showing a modified arrangement of magnets. Fig. 8 is a horizontal section in line 8—8, Fig. 7.

Similar letters of reference indicate corresponding parts throughout the several views.

The main frame of the generator consists partly of two segmental pole pieces A, A¹ which are arranged concentrically opposite each other. These pole pieces may be arranged in any desired position but as shown in the drawings the same are arranged horizontally and one in front of the other. Each of the pole pieces is provided at its opposite longitudinal edges with upper and lower longitudinal flanges $b$, $b^1$ which are connected by upper and lower transverse pillars $c$, $c^1$. Legs or brackets D, D project laterally from opposite ends of the flanges of the rear pole piece A¹ and the rear ends of the pair of legs at each end of the rear pole piece are connected by a vertical foot or flange E which projects outwardly therefrom in the direction of the axis of the generator. Upright transverse heads or end plates F, F are applied to the corresponding ends of the pole pieces and their flanges.

The pole pieces A, A¹ are made of sheet iron while the pillars $c$, $c^1$ and the end plates F, F are made of brass or other non-magnetic material.

The front pole piece A together with its longitudinal flanges is stamped out of a single piece of sheet iron. The rear pole piece A¹ together with its flanges $b$, $b^1$, the brackets or legs D, D and the feet E are also stamped and bent up out of a single piece of sheet iron, as shown in Fig. 6. Each of the legs D is preferably provided with a longitudinal rib $d$ which is raised or stamped out of its stock for the purpose of reinforcing or increasing the strength thereof and each of the feet or flanges E is provided with perforations $e$ which receive screws or other fastenings whereby the generator is attached to the surface upon which it is to be supported.

G, G¹ represent a plurality of permanent horseshoe magnets which are arranged in a row lengthwise of the generator and each of which straddles the two pole pieces. The legs of each of these magnets engage their inner sides with flat faces $h$ formed on the outer side of the crowns or magnetic center of the pole pieces and are held firmly in engagement therewith by means of fastening screws I, each of which is arranged transversely between two adjacent magnets and engages its inner screw threaded end with the adjacent end of one of the upper pillars while the head $i$ at its outer end bears against a washer $j$ which latter in turn bridges the two adjacent magnets and bears against the outer side of the same.

Heretofore the flat bearing faces $h$ of the pole pieces were produced by milling which operation is expensive. In order to reduce the cost of producing these flat faces the pole pieces are subjected to a pressing, stamping or swaging operation whereby the metal on opposite sides of the magnetic center thereof is displaced sufficiently to form said flat faces while retaining the circular formation of the bore or inner sides of the pole pieces. This is preferably effected by pressing or indenting two longitudinal grooves $k$, $k$ into the inner side of each pole piece and on opposite sides of its center by means of suitably constructed dies, whereby the metal in each pole piece on opposite sides of its center is displaced or crowded outwardly sufficiently to form a flat area on the outer side of the pole piece for obtaining the necessary surface contact with the respective leg of the magnet. Inasmuch as this stamping operation for producing the flat faces can be effected very rapidly without sacrificing accuracy the cost of fitting up this portion of the generator is materially reduced.

For the sake of economy it is customary to make all of the magnets of the same size and employ a greater or less number for generators of different capacity and also to make the pole pieces and other parts of varying length to suit the particular number of magnets which are employed. This variation in the length of the pole pieces was made necessary heretofore owing to the fact that the sides of the magnets were left perfectly straight which prevented the magnets from being placed any closer together than the diameter of the fastening screws I which pass through the spaces between the magnets. In order to permit of placing the magnets closer together one or more of the same is provided on one or both of its sides adjacent to the fastening screw or screws I with a notch or recess $l$ into which the body of the fastening screw projects more or less. As shown in Fig. 1, four magnets are employed and the same practically occupy the full length of the pole pieces. The end magnets G of this set are unrecessed or provided with straight sides the same as the magnets heretofore commonly employed. Each of the intermediate magnets $G^1$ has each of its legs provided on its opposite sides adjacent to the fastening screws I with segmental notches or recesses $l$. Each of the central fastening screws I is arranged between the two corresponding legs of two intermediate magnets and projects with its opposite sides part way into the opposing recesses of these magnets while each of the extreme fastening screws engages with one side against the adjacent side of one of the end magnets while its opposite side projects partly into the adjacent notch or recess of the respective intermediate magnet. It will thus be observed that by notching or recessing some of the magnets sufficient clearance is provided for the passage of the fastening screws, which are usually employed for this purpose, thereby permitting the magnets to be placed closer together and enabling a greater number of the same to be employed for a given length of pole pieces. When it is desired to use the same length of frame or pole pieces for a generator of somewhat lower capacity three magnets of the ordinary unrecessed kind may be applied to the same frame in the usual manner. The position of three of such magnets, instead of four, is indicated in Figs. 7 and 8. When three magnets are thus used only four fastening screws I are employed, two on each side, each of which is arranged between one leg of the central magnet $G^2$ and the adjacent leg of one of the end magnets $G^3$, these magnets being separated a sufficiently greater distance to permit of threading the screws into the frame between the magnets without necessitating recessing of the same. In the manufacture of telephone generators it is more economical to reduce the number of sizes of frames to a minimum and still permit of obtaining generators of varying capacity. By thus notching or recessing the magnets for the reception of the fastening screws I it is possible to use the same frame either for a four magnet generator or for a three magnet generator. When a greater variation in the capacity of the generator is desired it is preferable to employ a different size of frame on which the magnets may be disposed in the same manner for converting the same into two generators of different capacity, that is to say, a frame capable of receiving two ordinary magnets for producing a generator of lower capacity can be converted into one of higher capacity by mounting thereon three magnets the central one of which is notched to provide the necessary clearance for the fastening screws. The same principle can be carried into effect by applying either four or five magnets on the frame of a larger size generator and so on for generators of still greater capacity.

Each of the end plates F is secured in place by means of screws $n$ passing through openings in the lower part thereof and entering the adjacent one of the lower pillars $c^1$ and by a screw $o$ passing through the upper part of this plate and entering the adjacent one of the upper pillars $c$.

P represents the armature rotating between the pole pieces and mounted on a shaft $p$ which is journaled in bearings arranged on the central part of the end plates. For the sake of greater durability these bearings are usually made of brass and mounted on the end plates. The superior bearings and the means of mounting the same on the end plates, shown in the drawings, are constructed as follows: Q represents a shell or cup which is drawn or stamped out of the stock of each end plate so as to form a cylindrical socket which is open at its inner end and provided at its outer end with an inwardly projecting annular flange or shoulder $q$. Each of the bearings in which one end of the armature shaft is journaled has the form of a cylindrical bushing composed of an enlarged inner part R and a reduced outer part $r$ forming an outwardly facing shoulder $s$ on the bushing. This bushing is introduced into the socket from its inner end until the shoulder thereof engages with the shoulder of the socket and its outer reduced part is within the bore of the flange $q$ after which the outer end of the bushing is upset or riveted over the outer edge of said flange for holding the bushing in place. This manner of constructing the armature shaft bearings and supporting the same in the end plates of the frame is more durable and holds the armature shaft more reliably in place than the bearings as heretofore constructed and mounted inasmuch as a firm support for the bushing is provided around its entire circumference on the end plate and displacement thereof is positively prevented.

In order to retain the end plates F in position on the pole pieces so that the bearings thereof together with the armature and its shaft are maintained in axial alinement with the pole pieces the inner side of each end plate is provided with an annular row of radial projections $t$ the outer ends or edges of which are milled or formed concentric with the axis of the armature shaft and bearing and engage with the bore of the pole pieces at the ends thereof. These centering projections are preferably constructed in the form of ribs which are produced in each end plate by stamping the same inwardly. These ribs or projections not only center the armature shaft relatively to the pole pieces but they also stiffen or reinforce the end plates materially and render the same less liable to get out of order when subjected to rough usage.

U represents the driving shaft which is journaled lengthwise of the generator in bearings $u$, $u$ at the upper end of the end plates and which is provided at one end with a crank $v$ for rotating the same. Motion is transmitted from this shaft to the armature shaft by an intermeshing gear W and pinion $w$.

For the purpose of strengthening, reinforcing or stiffening the upper part of the end plates to prevent easy disarrangement of the same each of these plates is provided with an annular rib $x$ arranged concentric with the driving shaft and a radial rib $y$ projecting downwardly from the annular rib. The annular and radial rib are formed by indenting or pressing inwardly the metal of the end plate at the upper end thereof.

It will be observed that in our improved construction of generator the end plates which carry the bearings of the armature and driving shafts do not serve as the primary or main support of the generator but that this function is performed by the pole pieces which are connected by the brackets to the supporting surface, whereby the armature bearings are less liable to disarrangement inasmuch as the main weight of the generator is not supported by the end plates and the latter perform the sole function of carrying the bearings of the driving and armature shafts.

We claim as our invention:

1. An electric generator having two pole pieces, and supporting brackets for one of said pole pieces formed integrally therewith and at opposite ends thereof from sheet metal and each bracket having arms projecting laterally from the pole piece on opposite sides of its longitudinal center, substantially as set forth.

2. An electric generator having front and rear pole pieces each of which is provided on opposite sides with longitudinal flanges, pillars connecting the flanges of one pole piece with the flanges of the other pole piece, pairs of legs projecting laterally from the opposite ends of the flanges of the rear pole piece and each having a longitudinal stiffening rib, and feet connecting the legs of each pair and projecting outwardly in the direction of the length of the pole pieces, said front pole piece being formed out of one sheet of iron and said rear pole piece being formed integrally with said legs, ribs and feet of another sheet of iron, substantially as set forth.

3. An electric generator having two sheet metal curved pole pieces each of which is provided with a longitudinal flat face on the central part of its convex outer side for engagement with a magnet, and with indentations on its concave inner side on opposite sides of the longitudinal center of the pole piece, substantially as set forth.

4. An electric generator having two segmental pole pieces arranged concentrically opposite each other, and armature supporting plates constructed of sheet metal and each extending across a pair of corresponding ends of the pole pieces and provided with an annular row of inwardly bent or indented projections or ribs which have their outer ends arranged concentrically and engaged with the bore of said pole pieces, substantially as set forth.

5. An electric generator having two segmental pole pieces arranged concentrically opposite each other, an armature rotatable between said pole pieces and mounted on a concentric shaft, end plates arranged at opposite ends of the pole pieces and provided with bearings in which said shaft is journaled, and an annular series of radial projections or ribs arranged on the inner side of each end plate and having their outer ends concentric with its bearing and fitting the bore of the adjacent ends of the pole pieces, said end plates being constructed of sheet metal and the projections or ribs being formed integrally thereon by pressing the plates inwardly, substantially as set forth.

6. An electric generator having two pole pieces arranged opposite each other, sheet metal end plates arranged at opposite ends of said pole pieces, an armature rotatable between said pole pieces and mounted on a shaft which is journaled in bearings on the lower part of said end plates, a driving shaft journaled in bearings in the upper part of said end plates and operatively connected with said armature shaft, and indented annular stiffening ribs arranged on said end plates concentric with said driving shaft bearings, substantially as set forth.

7. An electric generator having two pole pieces arranged opposite each other, sheet metal end plates arranged at opposite ends of said pole pieces, an armature rotatable between said pole pieces and mounted on a shaft which is journaled in bearings on the lower part of said end plates, a driving shaft journaled in bearings in the upper part of said end plates and operatively connected with said armature shaft, indented annular stiffening ribs arranged on said end plates concentric with said driving shaft bearings, and an indented radial stiffening rib extending downwardly from the annular rib of each end plate, substantially as set forth.

8. An electric generator having two pole pieces arranged opposite each other, an armature rotatable between said pole pieces, a shaft upon which said armature is mounted, sheet metal end plates arranged at opposite ends of the pole pieces and each having a cylindrical socket drawn outwardly on the same and terminating at its outer end in an internal annular flange, and bushing bearings in which said shaft is journaled and each of which consists of a cylindrical inner part arranged in one of said sockets, a contracted outer part arranged within the flange of said socket and forming a shoulder which bears against the inner side of said flange, and a rivet head arranged at the outer end of the contracted part of said bushing bearing and engaging with the outer side of said flange, substantially as set forth.

Witness our hands this 17th day of May, 1906.

KLAS WEMAN.
ALFRED LARSSON.

Witnesses:
CARL H. SMITH,
HERVEY J. DRAKE.